United States Patent
Horiuchi et al.

(10) Patent No.: US 8,722,119 B2
(45) Date of Patent: May 13, 2014

(54) PROCESS FOR PRODUCING FERMENTED MILK

(75) Inventors: Hiroshi Horiuchi, Kanagawa (JP); Akira Yano, Kanagawa (JP)

(73) Assignee: Meiji Co., Ltd., Tokyo (JP)

( * ) Notice: Subject to any disclaimer, the term of this patent is extended or adjusted under 35 U.S.C. 154(b) by 596 days.

(21) Appl. No.: 12/064,971

(22) PCT Filed: Aug. 29, 2006

(86) PCT No.: PCT/JP2006/316974
§ 371 (c)(1), (2), (4) Date: Jul. 17, 2008

(87) PCT Pub. No.: WO2007/026697
PCT Pub. Date: Mar. 8, 2007

(65) Prior Publication Data
US 2009/0136621 A1   May 28, 2009

(30) Foreign Application Priority Data
Aug. 30, 2005   (JP) ................................ 2005-248541

(51) Int. Cl.
*A23C 9/12*   (2006.01)
(52) U.S. Cl.
USPC .................................. 426/42; 426/34; 426/40
(58) Field of Classification Search
USPC .............................................. 426/34, 40, 42
See application file for complete search history.

(56) References Cited

U.S. PATENT DOCUMENTS

| | | | | |
|---|---|---|---|---|
| 3,924,007 | A * | 12/1975 | Driessen et al. | 426/43 |
| 5,098,721 | A * | 3/1992 | Kosikowski et al. | 426/61 |
| 2003/0152665 | A1* | 8/2003 | De Vuyst et al. | 426/34 |

FOREIGN PATENT DOCUMENTS

| | | |
|---|---|---|
| EP | 1568280 A1 | 8/2005 |
| EP | 1759587 A1 | 3/2007 |
| JP | 05-276864 A | 10/1993 |
| JP | 10099019 A | 4/1998 |
| JP | 2003-125701 A | 5/2003 |
| JP | 2003-339314 A | 12/2003 |
| JP | 3644505 B1 | 2/2005 |
| JP | 3666871 B1 | 4/2005 |
| JP | 2005-176603 A | 7/2005 |
| JP | 2005-218388 A | 8/2005 |
| JP | 2005-261303 A | 9/2005 |
| JP | 4465297 B2 | 5/2010 |
| WO | 2004/049812 A1 | 6/2004 |
| WO | 2005/120240 A1 | 12/2005 |

OTHER PUBLICATIONS

Machine Translation of JP 2003-125701 (2003).*
Machine Translation of JP 2005-176603 (2005).*
NPL "Starter Culture Amount" retrieved on Feb. 12, 2012.*
Talabardon, M., et al., "Anaerobic thermophilic fermentation for acetic acid production from milk permeate", Journal of Biotechnology, Jan. 2000, pp. 83-92, vol. 76, No. 1.
Examination Report issued Feb. 23, 2010 in counterpart New Zealand Application No. 566322.
Extended European Search Report dated Jun. 29, 2011 from the European Patent Office in a counterpart European Application No. 06796951.9.
Kunio Yamanouchi, "Milk Sogo Jiten" (Encyclopedia of Milk), (Third printing published on May 1, 1998), published by K.K. Asakura Shoten, p. 239 + 4 pages of English translation of p. 239.
Japanese Office Action dated May 9, 2011 issued in a counterpart application No. 2005-248541.

* cited by examiner

*Primary Examiner* — Humera Sheikh
*Assistant Examiner* — Bhaskar Mukhopadhyay
(74) *Attorney, Agent, or Firm* — Sughrue Mion, PLLC

(57) ABSTRACT

The present invention relates to a process for producing fermented milk, including adding to a milk mix a starter in an amount of from 0.2 to 0.8% by weight with respect to the total amount of the milk mix, reducing the dissolved oxygen concentration in said mix to 5 ppm or less and conducting a fermentation after said addition of the starter and said reduction of the dissolved oxygen concentration

4 Claims, No Drawings

PROCESS FOR PRODUCING FERMENTED MILK

TECHNICAL FIELD

The present invention relates to a novel and useful process capable of producing fermented milk of pre-fermentation type having fine texture and mild flavor, at a high fermentation temperature for a short time in comparison with conventional processes; as well as fermented milk obtainable by the process.

BACKGROUND ART

Fermented milk is produced by fermenting milk, or milk or the like containing a non-fat milk solid content at the same level as or at a higher level than that of the milk, with lactic acid bacteria or yeast and then preparing the resulting product into paste or liquid or freezing the product. Fermented milk can be broadly classified into two types. One is pre-fermentation type while the other is post-fermentation type. The former is produced by disrupting fermented milk, on which fermentation and cooling have been completed in a tank prior to filling the milk in a container, and then filling the resulting fermented milk into an individual container for distribution. The latter is produced by filling a raw material mix for fermented milk (referred to as mix hereinafter) with a given amount of a starter added thereto in an individual container for distribution, such as paper container; fermenting the mix in a fermentation chamber until a lactic acid acidity reaches to a predetermined degree to solidify the mix into a pudding-like form; and then cooling the resulting product. Pre-fermentation is frequently used for producing fruit yogurt containing fruit and yogurt drinks, while post-fermentation is commonly used for producing yogurt of so-called hard type and plain type, and the like.

For any of the fermentation types, a fermentation step includes adding a starter to the sterilized mix at a given temperature for fermentation to a given acidity, and then cooling the resulting product to terminate the fermentation to obtain a product. The fermentation temperature and the fermentation time not only influence the production efficiency of the product but also highly influence the flavor and quality thereof. Therefore, the fermentation temperature and the fermentation time should appropriately be set, taking account of the influences thereon. In a case of intending to give mild flavor to the product, for example, the fermentation temperature is set to a lower temperature, which is accompanied by the fermentation time set to a longer time, and the like.

It is a problem herein that the fermentation time required until a given acidity is reached is prolonged far more than general, for example, in a case that the fermentation temperature is set lower so as to give mild flavor to the product; and the use of a longer fermentation time at a lower temperature causes a higher risk of microbial contamination, due to both the following factors: the temperature overlaps with a temperature zone where contaminating bacteria such as *Escherichia coli* (optimal growth temperature of 37° C.) and yeast (optimal growth temperature of 30° C.) actively proliferate and the induction period with a smaller pH change during fermentation is prolonged. As the method for reducing the risk, a method including sterilization under stronger conditions than general is proposed. However, the sterilization method has a relation with the physico-chemical properties of the final product. For example, in a case that sterilization is done under high temperature conditions such as UHT sterilization, the physico-chemical properties of fermented milk are so deteriorated that the mouth sensation of the final product is also deteriorated, disadvantageously.

Therefore, in the case of carrying out fermentation at a lower temperature for a longer time, examinations have been made about a sterilization process of a mix for fermented milk, without deterioration of the physico-chemical properties of the resulting fermented milk. For example, in the case that fermentation is to be done for a long time of 10 hours or more required for the raw materials for fermented milk to reach pH at 4.8, a sterilization process of the raw materials for fermented milk without deterioration of the physico-chemical properties of the final product has been reported, which comprises two-step sterilization. (Patent Document 1)

On the other hand, a process for producing fermented milk, by which the resulting fermented milk has not only fine texture and mild flavor but also such a tissue hardness as never found in fermented milk produced at a low temperature for a long time, so that the fermented milk consequently has acquired novel physico-chemical properties and mouth sensation, has been reported. The process includes carrying out low-temperature fermentation in conditions that a dissolved oxygen concentration in the mix for fermented milk is reduced and terminating fermentation for a short period of time. (Patent references 2 and 3).

The above process is used for producing hard yogurt of post-fermentation type and has an additional advantage that fermented milk with novel physico-chemical properties and texture as never found conventionally can be obtained by fermentation for a short time with a smaller risk of microbial contamination. However, this process is not suitable for producing pre-fermentation type where the tissue is damaged during a filling procedure, particularly for producing dessert-type fermented milk produced by adding and mixing fruit and the like.

Namely, since the process of Patent reference 2 or 3 is characteristic in that fermented milk having a hard tissue in comparison with that of fermented milk produced at a low temperature for a long period in the conventional art in addition to the characteristic texture can be obtained, the process is suitable for producing yogurt of post-fermentation type under no agitation during the production steps. Therefore, the process has not been completed for the purpose of producing products involving pre-fermentation in tanks and the like to be prepared on a prerequisite of the need of a procedure involving tissue damage, for example, yogurt of dessert type, such as fruit yogurt.

Patent document 1: JP-A-2003-125701
Patent document 2: Japanese Patent No. 3644505
Patent document 3: Japanese Patent No. 3666871

DISCLOSURE OF THE INVENTION

It is an object of the invention to provide a process for producing fermented milk at a relatively high fermentation temperature with a smaller risk of bacterial contamination, for a relatively short fermentation time approximately close to the general fermentation time, by which fermented milk having such fine texture and mild flavor as obtained conventionally only by fermentation at a low temperature for a long time and also having a smooth tissue suitable for dessert-type yogurt; as well as the fermented milk and fermented milk desserts obtainable by the process.

The present inventors made intensive studies to achieve the object. As a result, the inventors found that in the case that a starter for fermented milk to be added to the mix is used in an amount ¼-fold or less the general amount thereof to be added at the start of fermentation, and fermentation was carried out in conditions that of the dissolved oxygen concentration in the mix is reduced to 5 ppm or less and around a general fermentation temperature, the lactic acid acidity reaches to a intended degree within a time period of the general fermentation time or in a slightly longer time than the general fermentation time, so that fermentation is completed. The resulting fermented milk has the similar fine texture, smooth touch on tongue and mild flavor as those of fermented milk prepared at a low temperature for a long time and had a smooth tissue suitable for dessert-type yogurt.

Specifically, the invention relates to the following (1) to (6).

(1) A process for producing fermented milk, which comprises:

adding to a fermented milk mix a starter in an amount of from 0.2 to 0.8% by weight with respect to the total amount of the fermented milk mix;

reducing the dissolved oxygen concentration in said mix to 5 ppm or less; and conducting a fermentation after said addition of the starter and said reduction of the dissolved oxygen concentration.

(2) The process for producing fermented milk according to (1), wherein the fermented milk is fermented milk of pre-fermentation type.

(3) The process for producing fermented milk according to (1) or (2), wherein the fermentation is conducted at a temperature of from 35° C. to 45° C.

(4) The process for producing fermented milk according to any one of (1) to (3), wherein the fermentation is conducted for 3 to 5 hours.

(5) The process for producing fermented milk according to any one of (1) to (4), wherein the starter is added to the fermented milk mix in an amount of from 0.2 to 0.5% by weight with respect to the total amount of the fermented milk mix.

(6) The process for producing fermented milk according to any one of (1) to (5), wherein the dissolved oxygen concentration in said mix is reduced to 3 ppm or less.

(7) Fermented milk obtainable by the process according to any one of (1) to (6).

Namely, according to the present invention, fermented milk, which has such fine texture and mild flavor as conventionally obtained only by fermentation at a low temperature for a long time and also has a smooth tissue suitable for dessert-type yogurt to be produced by pre-fermentation, can be produced at a fermentation temperature and a fermentation time approximate to those for general fermentation. Therefore, the fermentation milk can be produced with a smaller risk of bacterial contamination at a one-day process similar to the process for general fermented milk. Additionally, the amount of the starter to be used can be greatly reduced.

BEST MODE FOR CARRYING OUT THE INVENTION

The invention is now described in detail hereinbelow.

Any milk may be used in accordance with the invention, with no specific limitation, so long as the milk is mammalian milk. Although the types thereof are not limited to the followings, they include cow milk, goat milk, sheep milk, water buffalo milk, swine milk and human milk. Among them, cow milk from Holstein species and Jersey species is preferably used owing to the ready availability and the cost.

As the lactic acid bacterial starter to be inoculated into the mix according to the invention, one or two or more kinds selected from lactic acid bacteria and yeast generally used in producing fermented milk may be used, as well as *L. bulgaricus, S. thermophilus,* and *L. lactis.* In accordance with the invention, a starter based on a mixture starter of *L. bulgaricus* and *S. thermophilus,* which is standardized as yogurt starter according to the Codex Standard, is preferably used. Taking account of the fermentation temperature and fermentation conditions for the intended fermented milk, other lactic acid bacteria such as *L. gasseri* and *Bifidobacterium* may be added, using the above-mentioned yogurt starter as the basis.

In the production fermented milk, generally, a starter in an amount of 2 to 3% by weight with respect to the total amount of a fermented milk mix is added to the fermented milk mix. Additionally, the fermentation time and fermentation temperature are generally 3 to 5 hours and 40 to 45° C., respectively.

In contrast, the amount of the starter to be added, the fermentation time and the fermentation temperature in accordance with the invention are individually shown below.

1) The amount of the starter to be added in accordance with the invention is at 0.2 to 0.8% by weight, preferably 0.2 to 0.5% by weight with respect to the total amount of the fermented milk mix, and is at about 10 to 25% of the amount thereof to be generally used and is far smaller than the amount thereof to be generally used. By adjusting the amount of the starter to be added to 0.8% by weight or less with respect to the total amount of the fermented milk mix, there can be obtained fermented milk with a loose tissue suitable for dessert yogurt, unlike the fermented milk with a hard tissue as described in Japanese Patent No. 3644505 or in Japanese Patent No. 3666871. By adjusting the amount of the starter to be added to 0.2% by weight or more with respect to the total amount of the fermented milk mix, the following limitations on fermentation temperature, fermentation time and the like can be satisfied.

2) In the present invention, the progress of fermentation is rather faster when the fermentation temperature is high. However, since smoothness and the like are lost when the fermentation temperature is too high, the fermentation temperature is preferably 35 to 45° C. in accordance with the invention.

3) Even in the present invention, the fermentation time is prolonged as a consequence of the amount of the starter to be added being adjusted to a smaller amount and the fermentation temperature being adjusted to a lower temperature. Since the invention is for the purpose of the production for such a fermentation time that the fermentation steps are completed in one day, the fermentation time is preferably 3 to 5 hours, so that the amount of the starter and the fermentation time should be selected appropriately for satisfying the conditions therefore, as described above. In such a manner, the risk of bacterial contamination can be greatly reduced while the production with fewer limitations in terms of the steps can be established.

The raw material mix to be used in the invention is obtainable by heating and dissolving milk materials such as milk, skim milk, skim milk powder and cream, and raw materials for routine use in producing fermented milk such as sugar, saccharides, flavor and water; and in the case that the stabilizer is used, additionally by adding and mixing preliminarily heated and dissolved gelatin solution, agar solution, pectin, and the like into the resulting mixture. In the present invention, however, even in the case that stabilizers and the like are not added, a tissue with shape retention ability at some level when scooped with a spoon can be retained even after filling procedure. Therefore, a product without adding any stabilizer may also be provided.

The raw material mix obtained in such manner is homogenized and sterilized, and then cooled approximately to a given temperature (fermentation temperature). A treatment for reducing the dissolved oxygen concentration as described below may satisfactorily be done in such a state. However, in the case of reducing the dissolved oxygen concentration via nitrogen substitution and the like, the treatment for the reduction is not necessarily to be carried out. Subsequently, a lactic acid bacterial starter in a reduced amount of 0.2 to 0.8% by weight with respect to the total amount of the fermented milk mix is inoculated and filled in a tank after agitation, for starting fermentation.

As a process for reducing the dissolved oxygen concentration in the mix, a process via gas substitution treatment with inactive gas, a membrane separation process using deoxygenated membrane and the like may be carried out, without any particular limitation. Herein, the dissolved oxygen concentration in the mix is preferably reduced to 5 ppm or less, more preferably 3 ppm or less. Among the methods described above, the process employing inactive gas substitution may be done after starter addition and has fewer limitations in terms of the steps, in comparison with the other processes. The process employing inactive gas substitution is described below. The substitution treatment may satisfactorily be done within the period of from the stage of preparing a raw material mix to the stage after the starter inoculation and before the start of fermentation, and the timing for the substitution may appropriately be set during the production steps. However, since it is important that the dissolved oxygen concentration is maintained to be reduced at the start of fermentation, the inactive gas substitution of the mix is preferably done during the period immediately before to immediately after the starter inoculation.

It is preferable to set the dissolved oxygen concentration in the mix at the start of fermentation as low as possible. Even in the process of the present invention, the tendency is the same as the results described in Japanese Patent No. 3644505. When the temperature of the mix is about 40° C., for example, the dissolved oxygen concentration is 5 ppm or less, preferably 3 ppm or less.

In the case that inactive gas substitution is carried out as a process for reducing the dissolved oxygen concentration, inactive gases such as nitrogen gas, argon gas and helium gas may be used. Especially, nitrogen gas is more preferably used as an inactive gas for general use in food. As a method for substituting dissolved oxygen with inactive gas, conventional methods such as a method including allowing these inactive gases to bubble directly into the mix, a method by means of static mixer, and a method including placing a gas together with the mix into a mixer for agitation may be employed.

In the case that the membrane separation process is carried out as a method for reducing the dissolved oxygen concentration, hollow fiber membrane (MHF304KM manufactured by Mitsubishi Rayon Co., Ltd., and the like) may be used as the deoxygenated membrane. The membrane can be used with reference to methods of using traditional membranes. The membrane is more preferably used when the dissolved oxygen concentration in a mix is reduced by applying the membrane to the mix before the starter addition.

According to the process of the present invention, since the purpose resides in the completion of fermentation at a fermentation temperature so as to secure fine texture and mild flavor within a fermentation time close to general fermentation time (within a time period capable of terminating fermentation steps in one day), a fermentation temperature of 35° C. to 45° C. is used. In the case that the fermentation temperature is around 35° C., then, the starter is used at an amount of about 25% of the general amount thereof to be used. By adjusting the fermentation temperature to 35° C. or more, fermentation can be completed within 5 hours in accordance with the invention involving the reduction of dissolved oxygen. By adjusting the fermentation temperature to 45° C. or less, yogurt with fine texture and mild flavor and with a tissue suitable for dessert yogurt can be obtained. So as to secure fine texture and mild flavor in the case of conducting fermentation around 45° C., the amount of a starter to be used is preferably smaller. In that case, the starter is used at an amount of about 10% of the general amount thereof to be used.

EXAMPLES

Although the invention is described in detail in the following Examples, the invention is not limited thereto.

Example 1

A mix was prepared by mixing 78.2 kg of milk, 2.6 kg of skim milk powder, and 19.2 kg of water, which was then heated and sterilized at 95° C. for 5 minutes. The mix was then cooled to 40° C., to which a lactic acid bacterial starter (a mix culture of *L. bulgaricus* JCM 1002T and *S. thermophilus* ATCC 19258) was inoculated at 0.50% by weight (the amount to be generally added in this case was 2.0% by weight). By passing a pipe through the mix to allow nitrogen gas to be mixed and dispersed therein, the dissolved oxygen concentration was adjusted to 5 ppm or less. It was then fermented in a tank at 40° C., until the lactic acid acidity reached 0.7% in 3 hours of fermentation time. Subsequently, the curd was disrupted and cooled to 10° C. or less, for terminating the fermentation. Then, the product was filled in a container as a final product.

Herein, the lactic acid acidity was titrated and calculated with phenol phthalein as an indicator, using 0.1N NaOH.

Organoleptic assessment was done about the mouth sensation of the inventive product by a panel of 22 persons to rank the sensation at 5 grades; "very smooth", "smooth", "medium", "not smooth" and "not smooth at all". Consequently, 18 persons among 22 persons of the panel remarked the product was "very smooth" or "smooth". None among 22 persons of the panel remarked that the product was "not smooth" or "not smooth at all". As to the tissue hardness, herein, the resulting fermented milk had such a soft tissue that it was difficult to measure the hardness thereof with a curd-meter.

The aforementioned results demonstrate that fermented milk which has fine texture and smooth mouth sensation and has a soft tissue suitable for dessert type yogurt is obtainable in accordance with the invention, despite that fermentation is done at a general fermentation temperature for a general fermentation time.

Example 2

Production of Fruit Yogurt

A mix was prepared by mixing 78.2 kg of milk, 2.6 kg of skim milk powder, 8.0 kg of sugar and 10.7 kg of water, which was then heated and sterilized at 95° C. for 5 minutes. The mix was then cooled to 40° C., to which a lactic acid bacterial starter (a mix culture of *L. bulgaricus* JCM 1002T and *S. thermophilus* ATCC 19258) was inoculated at 0.50% by weight (the amount thereof to be generally added was 2.0% by weight). By passing a pipe through the mix to allow nitrogen gas to be mixed and dispersed therein, the dissolved oxygen concentration was adjusted to 3 ppm or less. It was then fermented in a tank at 40° C., until the lactic acid acidity reached 0.9%. Subsequently, the curd was disrupted and cooled to 10° C. or less, for terminating the fermentation to produce fermented milk. The fermented milk was divided into two portions. Twenty % by weight of strawberry jam was added to one of the portions for agitation and mixing, and was then filled in a container to prepare a final product. Additionally, the remaining fermented milk was filled in a container as it was. Then, 20.0% by weight of strawberry jam was overlaid in each container, to prepare a final product.

Both the fermented milk types had very good flavor as dessert yogurt, because the fine texture and mild flavor of the inventive yogurt and the sour taste of strawberry jam were mixed together therein. Particularly, the flavor and good taste of the inventive yogurt was intensified in the latter to be ingested after mixing, so the latter yogurt was more excellent yogurt.

While the invention has been described in detail and with reference to specific embodiments thereof, it will be apparent to one skilled in the art that various changes and modifications can be made therein without departing from the scope thereof.

This application is based on Japanese patent application No. 2005-248541 filed Aug. 30, 2005, the entire contents thereof being hereby incorporated by reference.

Further, all references cited herein are incorporated in their entireties.

Industrial Applicability

According to the present invention, fermented milk, which has such fine texture and mild flavor as conventionally obtained only by fermentation at a low temperature for a long time and also has a smooth tissue suitable for dessert-type yogurt to be produced by pre-fermentation, can be produced at a fermentation temperature and a fermentation time approximate to those for general fermentation. Therefore, the fermentation milk can be produced with a smaller risk of bacterial contamination at a one-day process similar to the process for general fermented milk. Additionally, the amount of the starter to be used can be greatly reduced.

The invention claimed is:

1. A process for producing pre-fermentation type fermented milk having fine texture and mild flavor, which comprises:
   (a) adding to a mixture for making pre-fermentation type fermented milk a starter in a total amount of from 0.2 to 0.5% by weight with respect to the total amount of the mixture,
   wherein the starter comprises at least one of *L. bulgaricus, S. thermophilus, L. lactis, L. gasseri* and *Bifidobacterium*;
   (b) reducing the dissolved oxygen concentration in the resulting mixture obtained in (a) to 5 ppm or less; and
   (c) subjecting the mixture obtained in (b) to fermentation to obtain a pre-fermentation type fermented milk, wherein the fermentation is conducted at a temperature of from 40° C. to 45° C. and for 3 to 5 hours, followed by
   (d) disrupting and cooling the obtained pre-fermentation type fermented milk to terminate the fermentation, thereby producing the pre-fermentation type fermented milk.

2. The process for producing pre-fermentation type fermented milk according to claim 1, wherein in step (b), the dissolved oxygen concentration in said mixture is reduced to 3 ppm or less.

3. A pre-fermentation type fermented milk obtained by the process according to claim 1.

4. The process for producing pre-fermentation type fermented milk according to claim 1, wherein the mixed starter is added in an amount of from 25% to 10% of the amount of the starter necessary to give lactic acid acidity of 0.7%.

* * * * *